United States Patent [19]

Kalyanaraman et al.

[11] Patent Number: 5,023,167
[45] Date of Patent: Jun. 11, 1991

[54] OPTICAL INFORMATION CARD

[75] Inventors: Palaiyur S. Kalyanaraman, Fanwood; Frank J. Onorato, Phillipsburg, both of N.J.

[73] Assignee: Hoechst Celanese Corp., Somerville, N.J.

[21] Appl. No.: 490,217

[22] Filed: Mar. 8, 1990

[51] Int. Cl.⁵ ............................................. G03C 1/00
[52] U.S. Cl. .................................. 430/495; 430/270; 430/945; 430/273; 430/271; 427/164; 427/166; 428/64
[58] Field of Search ............... 430/270, 495, 945, 273, 430/271; 428/64; 427/164, 166

[56] References Cited

U.S. PATENT DOCUMENTS 4,584,259  4/1986  Mayer et al. ..................... 430/273
4,735,889  4/1988  Namba et al. .................... 430/273
4,920,359  4/1990  Arai et al. ........................ 430/495

FOREIGN PATENT DOCUMENTS 61-074890  4/1986  Japan ................................ 430/273

Primary Examiner—Charles L. Bowers, Jr.
Assistant Examiner—Ashley I. Pezzner
Attorney, Agent, or Firm—M. W. Ferrell

[57] ABSTRACT

Provided is an optical information card having a particular structure. The card is comprised of four different layers, i.e., a card substrate, a recording layer which is formed on one side of the card substrate and which comprises a naphthalocyanine compound, a polyvinyl alcohol coating directly over the information layer, and a transparent protective layer over the polyvinyl alcohol layer. This structure offers a very sensitive and useful optical information card which can be easily manufactured while maintaining the integrity of the information layer, and which permits one to realize the advantage of using a naphthalocyanine information layer in a card format.

11 Claims, 1 Drawing Sheet

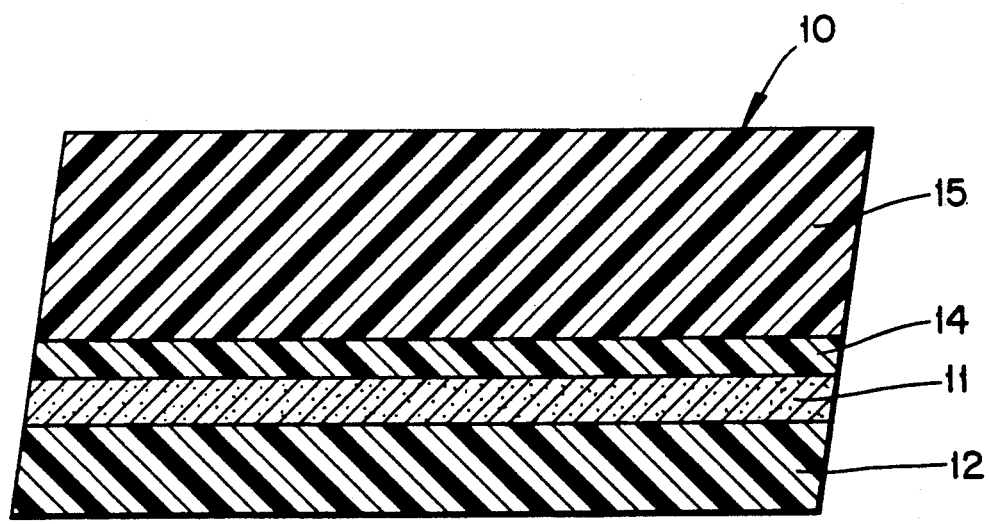

OPTICAL INFORMATION CARD

BACKGROUND OF THE INVENTION

This invention relates to an optical data storage medium, and in particular an optical information recording card. More specifically, the present invention relates to an optical information recording card utilizing specific structural layers.

Much effort has been devoted to the application of optical information techniques to plastic cards. For example, see U.S. Pat. Nos. 4,837,134; 4,835,048; 4,816,362; 4,811,321 and 4,787,075. In conventional information recording cards, which use embossed characters or magnetic stripes for recording, the recording capacity does not always suffice. By applying the technology of optical information recording to plastic cards, optical information recording cards with a read-only memory type having a recording capacity of greater than 200 KB have been reported (see, for example, U.S. Pat. No. 4,835,048). The application of optical information technology to plastic card format therefore holds great promise.

However, problems arise when considering a card format in conjunction with an optical information layer. One major problem is the fact that the card is handled frequently, and with no impunity. Scratching of the optical information layer is therefore a great risk, unless it is protected. Thus, heavy protective overcoat layers are a necessity. Applying such heavy overcoat layers in itself raises problems with respect to maintaining the stability and integrity of the information layer during the manufacturing process. Ease of manufacture is also a major consideration in any commercial process.

Accordingly, it is an object of the present invention to provide one with an optical information card of a structure which is easily and efficiently manufactured.

Another object of the present invention is to provide an optical information card utilizing a naphthalocyanine chromophore containing information layer.

Still another object of the present invention is to provide one with a novel and useful optical information card exhibiting high sensitivity, and which can be easily manufactured while maintaining the integrity of the information layer.

These and other objects and aspects of the present invention will become apparent to the skilled artisan upon a review of the following specification, the Drawing and the claims appended thereto.

SUMMARY OF THE INVENTION

The foregoing objects are realized by providing an optical information card having a particular structure. Essentially, the card is comprised of four different layers, i.e., a card substrate, a recording layer which is formed on one side of the card substrate and which comprises a naphthalocyanine compound, a polyvinyl alcohol coating over the information layer, and a transparent protective layer over the polyvinyl alcohol layer. This structure offers a very sensitive and useful optical information card which permits one to realize the advantages of using a naphthalocyanine information layer in a card format.

BRIEF DESCRIPTION OF THE DRAWING

The single FIGURE of the Drawing is a schematic and sectional illustration of an optical information card in accordance with the present invention.

DETAILED DESCRIPTION OF THE PREFERRED EMBODIMENTS

The FIGURE of the Drawing shows the construction of an optical information recording card 10 according to the present invention. The card 10 is made up of a card substrate 12, an optical recording layer 11, a polyvinyl alcohol layer 14 and a transparent protective layer 15 which closely covers the outer surface of the polyvinyl alcohol layer 15 and the recording layer 11.

The material of the card substrate 12 is comprised of a material exhibiting good mechanical strength and good structural integrity. It is most useful to use a synthetic resin, with polycarbonate or polymethylmethacrylate being the most preferred materials for use as the card substrate.

The information layer 11 is comprised of a naphthalocyanine chromophore. Among the most preferred naphthalocyanine chromophores useful in the present invention are the naphthalocyanine chromophores of the following formula, containing the substituents as defined below:

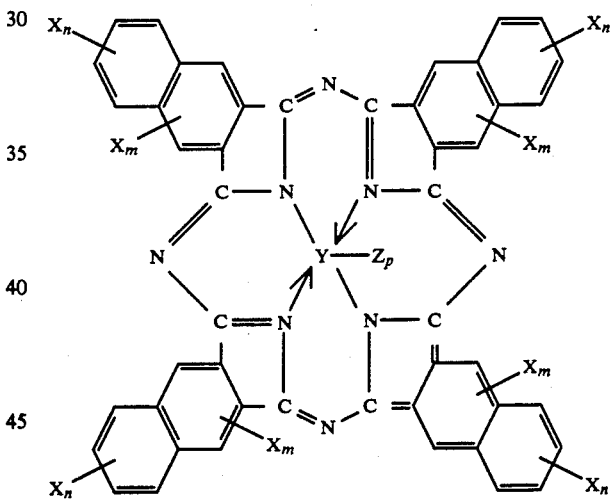

wherein Y is Si, Ge, Sn, Al, Ga, In or a transition metal, more preferably Si or Ge, and most preferably Si;

Z is halogen, hydroxy, $OR_1$ or $OSiR_2R_3R_4$, wherein $R_1$ is an alkyl having at least four carbons; aryl having at least 6 carbons; acyl having at least 4 carbons; cycloalkyl having at least four carbons; or a polyether, and wherein $R_2$, $R_3$ and $R_4$ can be the same or different and are alkyl having from 1 to about 18 carbons; aryl having from 6 to 10 carbons; cycloalkyl having at least 4 carbons; siloxy; or alkoxy having at least 3 carbons;

with p representing the number of Z substituents and being either 0, 1 or 2, more preferably 1 or 2, and most preferably 2; and wherein the X substituents can be the same or different and are independently selected from halogen; alkyl having at least 4 carbons; aryl having from 6 to 10 carbons; acyl having at least 4 carbons; $NR_5R_6$; $NO_2$; $OR_7$; $SO_3$—; or $SO_2NR_5R_6$, with $R_5$ and $R_6$ being the same or different and being H; alkyl having from one to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and wherein the X substituent is attached to the aromatic ring through the N atom when the substituent is $NR_5R_6$, $R_7$ is the same as $R_1$ defined above, and with n and m indicating the number of independently selected X substituents, each n being the same or different and ranging from 0 to 4, and each m being the same or different and ranging from 0 to 2.

In the foregoing naphthalocyanine chromophores, when p is a value such that all of the valences of the central atom are not occupied with Z substituents, any other valence or valences of the central atom can be occupied by any conventional single valence substituent, e.g., hydrogen, halide or hydroxy.

It is preferred that there be at least one Z substituent in the naphthalocyanine chromophores of the present invention. Both types of substituents, however, X and Z, may be present. As well, two different Z substituents can be present.

The foregoing naphthalocyanine chromophores are uniquely suited for use in the recording layers of optical recording media. These chromophores exhibit excellent chemical and photolytic stability, thereby rendering the chromophores extremely useful in the information layer of an optical recording medium. As well, the chromophores can exhibit unique spectral and solubility characteristics. These characteristics render the manipulation of the chromophore quite easy. Their excellent solubility characteristics can also be important if a polymer is to be used with the chromophore in formulating the information layer. As the chromophore becomes more compatible with the polymer, higher loading is achievable and the chance of phase separation is diminished. Solubility in the same solvent as the polymer used in the recording layer, if a polymer is desired to be used, also permits one to achieve higher loading of the chromophore in the recording layer, as well as to cast the chromophore/polymer using conventional techniques.

The foregoing naphthalocyanine chromophores of the present invention can also exhibit surprising film-forming properties, depending upon the substituents chosen, thereby allowing one the option of simply casting the chromophore without the need for a polymer. One is thereby able to realize the benefits of the thermomechanical properties of a film-forming material without the need for a polymer. This, in combination with the other unique characteristics of these chromophores renders the formulation of an information layer therefrom quite an easy task. As well, since the use of a polymer can be avoided, if desired, the problem of chromophore/polymer separation can be avoided.

The most preferred film-forming naphthalocyanine chromophores for use in the present invention are those chromophores within the aforedescribed general formula when p is 1 or 2, and Z is $(OSiR_8R_9)_kR_{10}$, with $R_8$ and $R_9$ being the same or different and being an alkyl having from 1 to about 18 carbon atoms, and preferably from 1 to about 4 carbon atoms, or an aryl having from 6 to about 12 carbon atoms;

k is at least 1 and is preferably from 1 to about 50, and when p is 2, k may be different for each Z group; and, with $R_{10}$ being a functionalized alkoxy; a functionalized alkoxy being defined as an alkoxy group containing additional functional units, i.e., functions containing atoms other than or in addition to C and H, with amide, ester, ether and alcohol functions being preferred additional functional units. More than one and/or a mixture of such additional functional units can be employed in the alkoxy group. The amide and/or the ether functions are the most preferred additional functional units. It is also most preferred that Y is Si in the foregoing naphthalocyanine chromophores.

Examples of preferred functionalized alkoxy groups ($R_{10}$) which can be employed include the following:

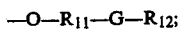

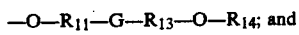

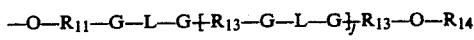

wherein $R_{11}$ is a divalent hydrocarbon radical in which the carbon atom attached to the oxygen is aliphatic, suitable examples being ethylene, propylene or phenethylene;

$R_{12}$ is alkyl, preferably having from one to eighteen carbon atoms, or aryl, preferably having from six to twelve carbon atoms;

$R_{13}$ is a divalent hydrocarbon radical;

$R_{14}$ is $R_{12}$ or H;

j is zero or greater, and preferably ranges from 0 to about 100;

G is a divalent radical containing atoms in addition to or in place of C and H, and preferably contains an ether, ester or amide function; and L is a divalent linking group such as a phenylene, diphenyl ether or polymethylene group, with 1,4-phenylene and 1,3-phenylene being among the preferred phenylene linking groups.

In the foregoing definitions, the alkyl groups can include branched and cyclic structures, as well as straight-chain structures.

Within the aforesaid parameters, preferred naphthalocyanine chromophores useful in the practice of the present invention include the following specific compounds:

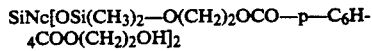

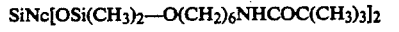

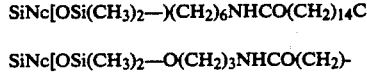

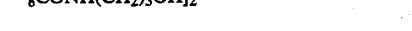

$SiNc[OSi(CH_3)_2—O(CHCH_3CH_2O)_3CH_3]_2$, and

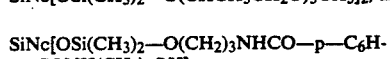

As a general consideration in the selection of the $R_8$, $R_9$ and $R_{10}$ moieties employed in the Z substituents of the foregoing preferred film-forming naphthalocyanine chromophores, their structures are generally dictated by the requirement of processability. For example, to obtain a desired level of solubility in the solvents used, it is undesirable for all of the R moieties to have the minimum number of carbon atoms discussed above. On the other hand, two of the moieties may have the minimum number, provided the third has a sufficient number of carbon atoms, or other characteristics, to result in the desired solubility.

While the foregoing preferred film-forming naphthalocyanine chromophores are characterized by their unique Z substitution off of the central atom, substitution off of the naphthalene rings can also be desirable. As discussed briefly above, such ring substituents can be employed to alter the absorption maximum of the chromophore molecule. Examples of such substituents include sulfonamide, alkyl, aryl, ether, sulfonate salts, halogen, amine, nitro and acyl substituents. Preferably, the number and type of the ring substituents are selected so as to result in an absorption maximum for the chromophore which corresponds to the output wavelength of the laser to be used in the optical recording.

While naphthalocyanine chromophores offer many advantages with regard to information recording layers, the problem in using a naphthalocyanine chromophore and necessarily employing a protective layer over the naphthalocyanine chromophore is that the protective layers are generally soluble in organic solvents which also attack the naphthalocyanine layer. This has created several problems in the utilization of naphthalocyanine chromophore containing information layers in the optical information card technology.

In the present invention, however, it has been found that if a polyvinyl alcohol layer 14 is used as a buffer layer between the naphthalocyanine information layer and the protective overcoat layer, excellent sensitivity and stability can still be realized in using a naphthalocyanine chromophore containing information layer, while also maintaining the integrity of the information layer during the manufacturing process. This polyvinyl alcohol layer 14 is formed over the entire area of the information layer 11. The information layer 11 may not be formed over the entire substrate 12, but only over selected partial areas of the card substrate. While the polyvinyl alcohol layer 14 need not be coated over those areas of the card substrate which should not contain the information layer, it is essential that it does cover all areas of the information layer.

The polyvinyl alcohol used in the layer 14 is preferably a good film forming polyvinyl alcohol, e.g., having a weight average molecular weight over 100,000, and most preferably about 125,000 mw or greater. Many suitable polyvinyl alcohols are commercial available.

In a most preferred embodiment, the polyvinyl alcohol used is hydrolyzed to such an extent that the polyvinyl alcohol is substantially only water soluble, i.e., the polyvinyl alcohol exhibits substantially no solubility in organic solvents. Preferably, the polyvinyl alcohol is at least 65% hydrolyzed, and most preferably at least 75% hydolyzed.

Both the information layer and the polyvinyl alcohol layer can be cast from solution. The information layer comprised of the naphthalocyanine compound can be cast from a suitable organic or alcohol solvent, with the polyvinyl alcohol layer being cast from an aqueous solution directly onto the napthalocyanine information layer. While the aqueous solution used in casting the polyvinyl alcohol can be primarily water, mixtures of water with other solvents can also be used provided the amount and nature of the other solvent is such that the information layer remains unaffected. An example of such a suitable mixture is a 90:10 volume mixture of water/isopropanol.

Any conventional coating technique may be used, including the use of a knife blade or spin coating. It is, of course, important that a relatively thin film coating be formed.

In a most preferred embodiment of the present invention, the polyvinyl alcohol coating ranges in thickness from about 200-1000 Angstroms, and is of a thickness less than the information layer. For it has been found that the use of such a polyvinyl alcohol layer permits one to further realize the advantages of improved carrier to noise ratio, and a much sharper threshold in the recording of information.

Once the polyvinyl alcohol layer 14 has been coated onto the information layer 11, the transparent protective layer 15 can then be easily and quickly coated over the polyvinyl alcohol layer. This can be done without fear of harming the naphthalocyanine containing information layer of the card. The protective layer can be any suitable organic layer, e.g., a suitable synthetic resin. It is most preferred, however, that the protective layer is a UV curable resin such as a polyacrylate. The protective layer can therefore be coated over the polyvinyl alcohol layer using a conventional technique and then cured.

Accordingly, the result is a very sensitive and usable optical information card, which advantageously can realize the inherent advantages of employing a naphthalocyanine chromophore, and in particular a silicon naphthalocyanine chromophore, in the optical information layer, which optical information card can be manufactured easily and quickly without fear for the integrity and viability of the information layer. This is the case due to the advantageous use of a polyvinyl alcohol buffer layer directly over the naphthalocyanine chromophore containing information layer.

The following examples are provided in order to further illustrate the present invention and a method of preparing the optical information card of the present invention. The examples are in no way meant to be limitative, but merely illustrative.

EXAMPLE 1

A solution comprised of 4.5 wt percent of a silicon naphthalocyanine dissolved in an alcohol solvent was used to coat a series of polycarbonate substrates. The solution absorbance was 1.40 at 778 nm. All of the substrates were coated manually on a spin coater, with the spin coating conditions for each sample being displayed in Table 1 below. After spin coating, the samples were heated at 80° C. for 30 minutes.

A coating of polyvinyl alcohol was added to three of the samples. A 2.5 wt percent solution of polyvinyl alcohol in a 90:10 volume mixture of water/isopropanol was spin coated at 200 rpm, and then spun at 2000 rpm for one minute. The samples were then heated at 50° C. for 20 minutes.

Measurement of reflectance and transmittance were then taken for each of the samples. Reflectance was measured at 811 nm and 780 nm, while transmittance was measured only at 811 nm. The results are provided below in Table 1.

TABLE 1

| Sample No. | Spin Speed, rpm | PVA Layer | 811 nm % R | 811 nm % T | 780 nm % R |
|---|---|---|---|---|---|
| 1 | 1500 | NO | 29.0 | 3.3 | 27.4 |

TABLE 1-continued

| Sample No. | Spin Speed, rpm | PVA Layer | 811 nm % R | 811 nm % T | 780 nm % R |
|---|---|---|---|---|---|
| 2 | 1500 | YES | 29.1 | 4.8 | 30.8 |
| 3 | 2500 | YES | 32.5 | 8.2 | 31.9 |
| 4 | 2500 | NO | 31.2 | 5.4 | 26.4 |
| 5 | 3500 | YES | 34.1 | 11.2 | 30.4 |
| 6 | 3500 | NO | 31.5 | 7.3 | 24.4 |

From the foregoing data, it can be seen that those naphthalocyanine media having a polyvinyl alcohol layer coated onto the naphthalocyanine layer exhibited improved reflectance at 780 nm. Any conventional overcoat protective layer can then be coated onto Sample Nos. 2, 3 or 5 to provide a medium which exhibits good sensitivity and integrity, and which can be useful as an optical information card.

EXAMPLE 2

Three polymethylmethacrylate optical card substrates were spin coated with the silicon naphthalocyanine solution used in Example 1. The spin coating speeds used were 1500, 2500 and 3500 rpm. After spin coating, the cards were heated at 70° C. for 20 minutes. A polyvinyl alcohol layer was then coated over the silicon naphthalocyanine layer of each card as in Example 1. The resulting cards were smooth, and no crystallization was observed. Upon adding a protective layer to the substrate/information layer/polyvinyl alcohol structure, each of the cards would make an excellent optical information card in accordance with the present invention.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An optical information card comprised of
   (i) a substrate;
   (ii) a naphthalocyanine containing information layer;
   (iii) a polyvinyl alcohol layer coated directly onto the naphthalocyanine layer wherein the said polyvinyl alcohol layer has a thickness in the range of from about 200-1000 Angstroms, and is of a thickness less than that of the information layer; and,
   (iv) a protective topcoat layer.

2. The optical information card of claim 1, wherein the naphthalocyanine containing information layer comprises a silicon naphthalocyanine.

3. The optical information card of claim 2, wherein the silicon naphthalocyanine is substituted at the central silicon atom with a siloxy substituent.

4. The optical information card of claim 3, wherein the siloxy substituent contains a functionalized alkoxy group, with the alkoxy group additionally containing an amide and/or ether function.

5. The optical information card of claim 1, wherein the polyvinyl alcohol layer is comprised of a polyvinyl alcohol which is at least 65% hydrolyzed.

6. The optical information card of claim 5, wherein the polyvinyl alcohol is at least 75% hydrolyzed.

7. The optical information card of claim 1, wherein the protective topcoat layer is comprised of a curable resin.

8. The optical information card of claim 1, wherein the protective topcoat layer is comprised of a cured resin.

9. The optical information card of claim 1, wherein the substrate is comprised of polycarbonate or polymethylmethacrylate.

10. An optical information card comprised of
    (i) a substrate comprised of polycarbonate or polymethylmethacrylate;
    (ii) a silicon naphthalocyanine containing information layer;
    (iii) a polyvinyl alcohol layer coated directly onto the naphthalocyanine layer, with the polyvinyl alcohol being at least 75% hydrolyzed; and,
    (iv) a protective topcoat layer which is comprised of a polyacrylate resin.

11. A method for preparing an optical information card which comprises
    (i) providing a substrate;
    (ii) coating a naphthalocyanine containing information layer thereon;
    (iii) coating from an aqueous solution a polyvinyl alcohol layer directly onto the information layer to thereby completely coat the information layer; and
    (iv) coating a protective topcoat layer onto the polyvinyl alcohol layer.

* * * * *